US006973459B1

(12) United States Patent
Yarmus

(10) Patent No.: US 6,973,459 B1
(45) Date of Patent: Dec. 6, 2005

(54) ADAPTIVE BAYES NETWORK DATA MINING MODELING

(75) Inventor: Joseph S. Yarmus, Groton, MA (US)

(73) Assignee: Oracle International Corporation, Redwood Shores, CA (US)

( * ) Notice: Subject to any disclaimer, the term of this patent is extended or adjusted under 35 U.S.C. 154(b) by 562 days.

(21) Appl. No.: 10/274,039

(22) Filed: Oct. 21, 2002

Related U.S. Application Data

(60) Provisional application No. 60/379,111, filed on May 10, 2002.

(51) Int. Cl.⁷ ......................................... G06F 707/102
(52) U.S. Cl. .................... 707/102; 707/100; 707/104.1
(58) Field of Search ................................. 707/1–104.1

(56) References Cited

U.S. PATENT DOCUMENTS

| 6,473,084 B1 * | 10/2002 | Phillips et al. ............... 345/440 |
| 6,606,615 B1 * | 8/2003 | Jennings et al. ............... 706/45 |
| 2002/0103793 A1 * | 8/2002 | Koller et al. .................. 707/3 |

FOREIGN PATENT DOCUMENTS

| EP | 797160 A2 * | 9/1997 | ........... G06F 17/30 |
| EP | 797161 A2 * | 9/1997 | ........... G06F 17/30 |

OTHER PUBLICATIONS

Oracle 9i Data Mining Concepts, "Basic ODM Concepts", Copyright 2002 Oracle Operation, pp. 1-28.*
Daryle Niedermayer, "An Introduction to Bayesian Networks and their Contemporary Applications", Dec. 1, 1998, pp. 1-14.*
A Study on the Performance of Large Bayes Classifier; Dimitris Meretakis, Hongjun Lu and Beat Wuthrich; Computer Science Dept., Hong Kong University of Science & Technology, Clear Water Bay, Hong Kong, China, pp. 1-14.
The Minimum Description of Length Principle in Coding and Modeling; Andrew Barron, Jorma Rissanen, and Bin Yu; IEEE Transactions on Information Theory, vol. 44, No. 6, Oct. 1998, pp. 2473-2760.
Approximating Probability Distributions to Reduce Storage Requirements; P.M. Lewis II, General Electric Research Laboratory, Schenectady, NY & Dept. of Electric Engineering & Computer Components & Systems Group, Massachusetts Institute of Technology, Cambridge, MA (1959), pp. 214-225.
Wrappers for Feature Subset Selections; Ron Kohavi & George H. John (Aug. 14, 1996),pp. 1-43.

(Continued)

Primary Examiner—Luke S Wassum
Assistant Examiner—Linh Black
(74) Attorney, Agent, or Firm—Swidler Berlin LLP

(57) ABSTRACT

A method, system, and computer program product for generating an Adaptive Bayes Network data mining model includes receiving a data table having a plurality of predictor columns and a target column, constructing a plurality of single-predictor models, ranking each single-predictor model using minimum description length and selecting a best single predictor model, performing feature selection, constructing a Naïve Bayes model, comparing a description length of the Naive Bayes model with a description length of a baseline model, replacing the baseline model with the Naïve Bayes model, if the description length of the Naive Bayes model is less than the description length of the baseline model, extending a plurality of single-predictor models in rank order, stepwise, to multi-predictor features, and testing whether each new feature should be included in or should replace a current model state using minimum description length.

21 Claims, 15 Drawing Sheets

OTHER PUBLICATIONS

*Comparing Bayesian Network Classifiers*; Jie Cheng & Russell Greiner; Dept. of Computing Science, University of Alberta, 8 pages.

*Efficient Learning of Selective Bayesian Network Classifiers*; Moninder Singh & Gregory M. Provan; University of Pennsylvania (Nov. 1995) pp. 1-28.

*Learning Bayesian Belief Networks An Approach based on the MDL Principle*; Wai Lam & Fahiem Bacchus; Dept. of Computer Science, University of Waterloo, pp. 1-31.

*An Analysis of Bayesian Classifiers*; Pat Langley; Wayne Iba & Kevin Thompson; In Proceedings of the Tenth National Conference on Artificial Intelligence (1992), pp. 223-228.

*Model Selection and the Principle of Minimum Description Length*; Mark H. Hansen & Bin Yu, pp. 1-48.

*On the Optimality of the Simple Bayesian Classifier under Zero-One Loss*; Pedro Domingos & Michael Pazzani; Dept. of Information & Computer Science, University of California, Irvine, CA 92697, pp. 1-30.

*Scaling Up the Accuracy of Naïve-Bayes Classifiers: a Decision-Tree Hybrid*; Ron Kohavi, Data Mining & Visualization, Silicon Graphics, Inc., pp. 1-6.

*Searching for Dependencies in Bayesian Classifiers*, Michael J. Pazzani, University of California, Irvine, pp. 239-248.

*Bayesian Network Classifiers*; Nir Friedman, Dan Geigerm Moses Goldszmidt; Kluwer Academic Publishers, Boston., pp. 1-37.

*Learning Maximum Likelihood Semi-Naïve Bayesian Network Classifier*; Kaizhu Huang, Irwin King & Michael Lyu; The Chinese University of Hong Kong, pp. 1-6.

* cited by examiner

Fig. 1

| PROB. OF TARGET CONDITIONED ON PREDICTOR | | | |
|---|---|---|---|
| P1 VALUE | T VALUE | COUNT | PR (T \| P1) |
| 0 | 0 | 30 | 0.375 |
| 0 | 1 | 50 | 0.625 |
| 1 | 0 | 20 | 0.2 |
| 1 | 1 | 80 | 0.8 |

Fig. 2

| PROB. OF PREDICTOR CONDITIONED ON TARGET | | | |
|---|---|---|---|
| P1 VALUE | T VALUE | COUNT | PR (P1 \| T) |
| 0 | 0 | 30 | 0.6 |
| 1 | 0 | 20 | 0.4 |
| 0 | 1 | 50 | 0.384615 |
| 1 | 1 | 80 | 0.615385 |

Fig. 3

| GLOBAL DIST. OF TARGET | | |
|---|---|---|
| T VALUE | COUNT | PR (T) |
| 0 | 50 | 0.277778 |
| 1 | 130 | 0.722222 |

Fig. 4

| PROB. OF TARGET CONDITIONED ON TWO PREDICTORS | | | | |
|---|---|---|---|---|
| P2 VALUE | P1 VALUE | T VALUE | COUNT | PR(T \| P1, P2) |
| 0 | 0 | 0 | 5 | 0.111111111 |
| 0 | 0 | 1 | 40 | 0.888888889 |
| 0 | 1 | 0 | 3 | 0.047619048 |
| 0 | 1 | 1 | 60 | 0.952380952 |
| 1 | 0 | 0 | 25 | 0.714285714 |
| 1 | 0 | 1 | 10 | 0.285714286 |
| 1 | 1 | 0 | 17 | 0.459459459 |
| 1 | 1 | 1 | 20 | 0.540540541 |

Fig. 5

| PROB. OF ONE PRED. COND. ON TARGET AND SECOND PRED. | | | | |
|---|---|---|---|---|
| P2 VALUE | P1 VALUE | T VALUE | COUNT | PR(P2 \| T, P1) |
| 0 | 0 | 0 | 5 | 0.166666667 |
| 1 | 0 | 0 | 25 | 0.833333333 |
| 0 | 0 | 1 | 40 | 0.8 |
| 1 | 0 | 1 | 10 | 0.2 |
| 0 | 1 | 0 | 3 | 0.15 |
| 1 | 1 | 0 | 17 | 0.85 |
| 0 | 1 | 1 | 60 | 0.75 |
| 1 | 1 | 1 | 20 | 0.25 |

Fig. 6

| PROB. OF TARGET CONDITIONED ON PREDICTOR | | | |
|---|---|---|---|
| P1 VALUE | T VALUE | COUNT | PR (T \| P1) |
| 0 | 0 | 30 | 0.375 |
| 0 | 1 | 50 | 0.625 |
| 1 | 0 | 20 | 0.2 |
| 1 | 1 | 80 | 0.8 |
| 2 | 0 | 0 | 0 |
| 2 | 1 | 5 | 1 |

Fig. 7

| PROB. OF TARGET CONDITIONED ON TWO PREDICTORS ||||| 
|---|---|---|---|---|
| P2 VALUE | P1 VALUE | T VALUE | COUNT | PR(T \| P1, P2) |
| 0 | 0 | 0 | 5 | 0.111111111 |
| 0 | 0 | 1 | 40 | 0.888888889 |
| 0 | 1 | 0 | 3 | 0.047619048 |
| 0 | 1 | 1 | 60 | 0.952380952 |
| 0 | 2 | 0 | 0 | #DIV/0! |
| 0 | 2 | 1 | 0 | #DIV/0! |
| 1 | 0 | 0 | 25 | 0.714285714 |
| 1 | 0 | 1 | 10 | 0.285714286 |
| 1 | 1 | 0 | 17 | 0.459459459 |
| 1 | 1 | 1 | 20 | 0.540540541 |
| 1 | 2 | 0 | 0 | 0 |
| 1 | 2 | 1 | 5 | 1 |

Fig. 8

| PROB. OF ONE PRED. COND. ON TARGET AND SECOND PRED. | | | | |
|---|---|---|---|---|
| P2 VALUE | P1 VALUE | T VALUE | COUNT | PR(P2 \| T, P1) |
| 0 | 0 | 0 | 5 | 0.166666667 |
| 1 | 0 | 0 | 25 | 0.833333333 |
| 0 | 0 | 1 | 40 | 0.8 |
| 1 | 0 | 1 | 10 | 0.2 |
| 0 | 1 | 0 | 3 | 0.15 |
| 1 | 1 | 0 | 17 | 0.85 |
| 0 | 1 | 1 | 60 | 0.75 |
| 1 | 1 | 1 | 20 | 0.25 |
| 0 | 2 | 0 | 0 | #DIV/0! |
| 1 | 2 | 0 | 0 | #DIV/0! |
| 0 | 2 | 1 | 0 | 0 |
| 1 | 2 | 1 | 5 | 1 |

Fig. 9

| GLOBAL PROBABILITIES | | |
|---|---|---|
| P2 VALUE | COUNT | PR(P2) |
| 0 | 108 | 0.5838 |
| 1 | 77 | 0.4162 |

Fig. 10

| PROB. OF ONE PRED. COND. ON TARGET AND SECOND PRED. | | | | |
|---|---|---|---|---|
| P2 VALUE | P1 VALUE | T VALUE | COUNT | PR(P2 \| T, P1) |
| 0 | 0 | 0 | 5.5837838 | 0.180122058 |
| 1 | 0 | 0 | 25.416216 | 0.819877942 |
| 0 | 0 | 1 | 40.583784 | 0.795760466 |
| 1 | 0 | 1 | 10.416216 | 0.204239534 |
| 0 | 1 | 0 | 3.5837838 | 0.170656371 |
| 1 | 1 | 0 | 17.416216 | 0.829343629 |
| 0 | 1 | 1 | 60.583784 | 0.747947948 |
| 1 | 1 | 1 | 20.416216 | 0.252052052 |
| 0 | 2 | 0 | 0.5837838 | 0.583783784 |
| 1 | 2 | 0 | 0.4162162 | 0.416216216 |
| 0 | 2 | 1 | 0.5837838 | 0.097297297 |
| 1 | 2 | 1 | 5.4162162 | 0.902702703 |

Fig. 11

| MODEL TABLE SCHEMA | |
|---|---|
| COLUMN NAME | COLUMN TYPE |
| TREE_NUMBER | NUMBER |
| DEPTH_OF_TREE | NUMBER |
| BLOCK_NUM | NUMBER |
| PARENT_BLOCK_NUM | NUMBER |
| TARGET_VALUE | NUMBER |
| PREDICTOR | VARCHAR2(30) |
| PREDICTOR_VALUE | NUMBER |
| PROBABILITY | NUMBER |
| LOG2_P | NUMBER |
| CNT | NUMBER |
| TARGET_PROBABILITY | NUMBER |

Fig. 12

| NODE CONSOLIDATION | | |
|---|---|---|
| P1 VALUE | P2 VALUE | T VALUE |
| 1 | 1 | 0 |
| 1 | 2 | 1 |
| 1 | 3 | 0 |
| 2 | 1 | 0 |
| 2 | 2 | 1 |
| 2 | 3 | 0 |
| 3 | 1 | 1 |
| 3 | 2 | 1 |
| 3 | 3 | 1 |

Fig. 13

| NODE CONSOLID. RESULT | | |
|---|---|---|
| P1 VALUE | P2 VALUE | T VALUE |
| 1,2 | 1 | 0 |
| 1,2 | 2 | 1 |
| 1,2 | 3 | 0 |
| 3 | 1 | 1 |
| 3 | 2 | 1 |
| 3 | 3 | 1 |

Fig. 14

| NODE CONSOLID. RESULT | | |
|---|---|---|
| P1 VALUE | P2 VALUE | T VALUE |
| 1,2 | 1,3 | 0 |
| 1,2 | 2 | 1 |
| 3 | 1,2,3 | 1 |

Fig. 16

| ESTIMATED POSTERIOR COST | | | | |
|---|---|---|---|---|
| P1 VALUE | T VALUE | PR (T \| P1) | COST | TOTAL COST |
| 0 | 0 | 0.375 | 1 * 0.625 | 0.625 |
| 0 | 1 | 0.625 | 3 * 0.375 | 1.125 |
| 1 | 0 | 0.2 | 1 * 0.8 | 0.8 |
| 1 | 1 | 0.8 | 3 * 0.2 | 0.6 |

Fig. 17

| WEIGHT DEPENDING UPON TARGET VALUE | | | |
|---|---|---|---|
| T VALUE | COUNT | PRIOR | WEIGHT |
| 0 | 80 | .05 | 200*0.05/80 = 0.125 |
| 1 | 120 | .95 | 200*0.95/120 =1.583333 |
| | 200 | 1.0 | |

Fig. 18

| PROB. OF TARGET COND. ON PRED. AFFECTED BY WEIGHT | | | | | | |
|---|---|---|---|---|---|---|
| P1 VALUE | T VALUE | COUNT | PR(T\|P1) | WEIGHT | ADJ. COUNT | ADJ. PR (T \| P1) |
| 0 | 0 | 30 | 0.375 | 0.125 | 3.75 | 0.0452262 |
| 0 | 1 | 50 | 0.625 | 1.58333 | 79.1665 | 0.9547738 |
| 1 | 0 | 20 | 0.2 | 0.125 | 2.5 | 0.0193549 |
| 1 | 1 | 80 | 0.8 | 1.58333 | 126.666 | 0.9806451 |

Fig. 19

| PROB. OF PRED. COND. ON TARGET UNAFFECTED BY WEIGHT | | | | | | |
|---|---|---|---|---|---|---|
| P1 VALUE | T VALUE | COUNT | PR(P1\|T) | WEIGHT | ADJ. COUNT | ADJ. PR (P1\|T) |
| 0 | 0 | 30 | 0.6 | 0.125 | 3.75 | 0.6 |
| 1 | 0 | 20 | 0.4 | 0.125 | 2.5 | 0.4 |
| 0 | 1 | 50 | 0.384615 | 1.58333 | 79.1665 | 0.3846154 |
| 1 | 1 | 80 | 0.615385 | 1.58333 | 126.666 | 0.6153846 |

Fig. 20

| NAME | TYPE |
|---|---|
| TREE_NUM | NUMBER |
| DEPTH_OF_TREE | NUMBER |
| SEGMENT_BUILD_TIME | NUMBER |
| FEATURE_SCORING_TIME | NUMBER |
| IS_TERMINATED | NUMBER(2) |
| IS_ACCEPTED | NUMBER(2) |
| EST_FEATURE_SCORING_TIME | NUMBER |

US 6,973,459 B1

ADAPTIVE BAYES NETWORK DATA MINING MODELING

CROSS-REFERENCE TO RELATED APPLICATIONS

The benefit of provisional application 60/379,111, filed May 10, 2002, under 35 U.S.C. § 119(e), is hereby claimed.

FIELD OF THE INVENTION

The present invention relates to a method, system, and computer program product for generating an Adaptive Bayes Network data mining model.

BACKGROUND OF THE INVENTION

Data mining is a technique by which hidden patterns may be found in a group of data. True data mining doesn't just change the presentation of data, but actually discovers previously unknown relationships among the data. Data mining is typically implemented as software in or in association with database systems. Data mining includes several major steps. First, data mining models are generated based on one or more data analysis algorithms. Initially, the models are "untrained", but are "trained" by processing training data and generating information that defines the model. The generated information is then deployed for use in data mining, for example, by providing predictions of future behavior based on specific past behavior.

One application for data mining is in the analysis of data collected by companies and other organizations. These entities are amassing huge databases for a multitude of purposes including accounting, billing, profiling of customer activities and relations, manufacturing operations, web-site activity, and marketing efforts. To enhance corporate competitiveness, interest has focused on the creation of data-warehouses and the extraction of information from these warehouses. Purposes for this information include targeting marketing promotions in a cost-effective manner, improving the relevance of a web-page to a visiting customer, displaying web-advertisements appropriate to the profile of a visiting customer, detecting fraudulent behavior, enhancing customer service, and streamlining operations.

To be useful to a general business analyst, a data mining methodology should require little user input and statistical skills. Because the problem and the data are not known in advance to the product designers, the data mining methods should be able to cope with a large space of potential problems whose analytic form is not known in advance (such methods are termed non-parametric methods). Furthermore the results should be understandable, so that the non-technical user can evaluate them.

A need arises for a technique by which data mining may be performed that requires little user input and statistical skills, is able to cope with a large space of potential problems whose analytic form is not known in advance, and which produces results that are understandable, so that a non-technical user can evaluate them.

SUMMARY OF THE INVENTION

The present invention is a method, system, and computer program product incorporating Adaptive Bayes Network (ABN) modeling that provides the capability to perform data mining, but requires little user input and statistical skills, is able to cope with a large space of potential problems whose analytic form is not known in advance, and which produces results that are understandable, so that a non-technical user can evaluate them.

A method of generating an Adaptive Bayes Network data mining model comprises the steps of receiving a data table having a plurality of predictor columns and a target column and comprising a plurality of rows of data, constructing a plurality of single-predictor models, comprising the steps of computing a description length of a baseline model based on unconditional target probabilities among the plurality of rows determining which predictor columns are correlated to the target column based on minimum description length, computing probabilities of at least two target values of the target column conditioned on at least two predictor values of at least one correlated predictor column, computing a probability of at least one correlated predictor column conditioned on at least two target values, ranking each predictor column by ranking each single-predictor model using minimum description length and selecting a best single predictor model, performing feature selection based on a minimum of a specified number of predictors and as a function of a reduction in entropy attributable to the best single predictor model, constructing a Naïve Bayes model using a top-ranked portion of the plurality of predictor columns, comparing a description length of the Naive Bayes model with a description length of a baseline model, replacing the baseline model with the Naïve Bayes model, if the description length of the Naive Bayes model is less than the description length of the baseline model, extending a plurality of single-predictor models in rank order, stepwise, to multi-predictor features, and testing whether each new feature should be included in or should replace a current model state using minimum description length.

The step of constructing a plurality of single-predictor models may further comprise the step of binning values included in the predictor columns. The step of ranking each predictor column by ranking each single-predictor model using minimum description length may comprise the steps of generating histograms of the target within each predictor bin value and obtaining, from the histograms, smoothed probabilities of target value conditioned on predictor value estimated as a proportion of each target value within a given predictor bin value. The step of ranking each predictor column by ranking each single-predictor model using minimum description length may comprise the step of computing the description length as a sum of a penalty term, $\Sigma \log_2 (n_i+1)$, where $n_i$ is a number of training row instances of an ith value of a predictor; and a transmission cost, $-\Sigma \log_2 (p_{ij})n_{ij}$, where $p_{ij}$ is the probability of a jth target value conditioned on an ith predictor value and $n_{ij}$ is a corresponding count. The step of extending a plurality of single-predictor models to multi-predictor features comprises the steps of extending a portion of the plurality of single-predictor models to multi-predictor features, one predictor at a time as far as minimum description length or a maximum depth parameter permits in rank order and extending each model to include a portion of the plurality of multi-predictor features as far as minimum description length pruning or a maximum number of network features parameter permits. The method may further comprise the step of biasing against selection of predictors with many missing values by using an encoding reflecting a proportion of potential single-predictor models attributable to each predictor. The method may further comprise the step of applying a reduced penalty term to a product model due to bias inherent in the product model's assumptions concerning data in the data table.

BRIEF DESCRIPTION OF THE DRAWINGS

The details of the present invention, both as to its structure and operation, can best be understood by referring to the accompanying drawings, in which like reference numbers and designations refer to like elements.

FIG. 1 is an exemplary table of probabilities of target values conditioned on values of a predictor column.

FIG. 2 is an exemplary table of probabilities of predictor column values conditioned on target values.

FIG. 3 is an exemplary table of global distribution of target values.

FIG. 4 is an exemplary table of probabilities of target values conditioned on values of two predictor columns.

FIG. 5 is an exemplary table of probabilities of values of one predictor column conditioned on target values and on values of a second predictor column.

FIG. 6 is an exemplary table of probabilities of target values conditioned on values of a predictor column.

FIG. 7 is an exemplary table of probabilities of target values conditioned on values of two predictor columns.

FIG. 8 is an exemplary table of probabilities of values of one predictor column conditioned on target values and on values of a second predictor column.

FIG. 9 is an exemplary table of global probabilities of values of a predictor column.

FIG. 10 is an exemplary table of probabilities of one predictor column conditioned on target values and on values of a second predictor column.

FIG. 11 is an exemplary table schema of a data table containing a representation of the model metadata.

FIG. 12 is an exemplary table used in node consolidation.

FIG. 13 is an exemplary table showing results of node consolidation.

FIG. 14 is an exemplary table showing results of node consolidation.

FIG. 16 is an exemplary table of estimated posterior cost.

FIG. 17 is an exemplary table of weight depending upon the target value.

FIG. 18 is an exemplary table of probabilities of target values conditioned on values of a predictor column affected by weight.

FIG. 19 is an exemplary table of probabilities of predictor values conditioned on values of the target column unaffected by weight.

FIG. 20 is an exemplary timings table schema.

DETAILED DESCRIPTION OF THE INVENTION

Figure 15:
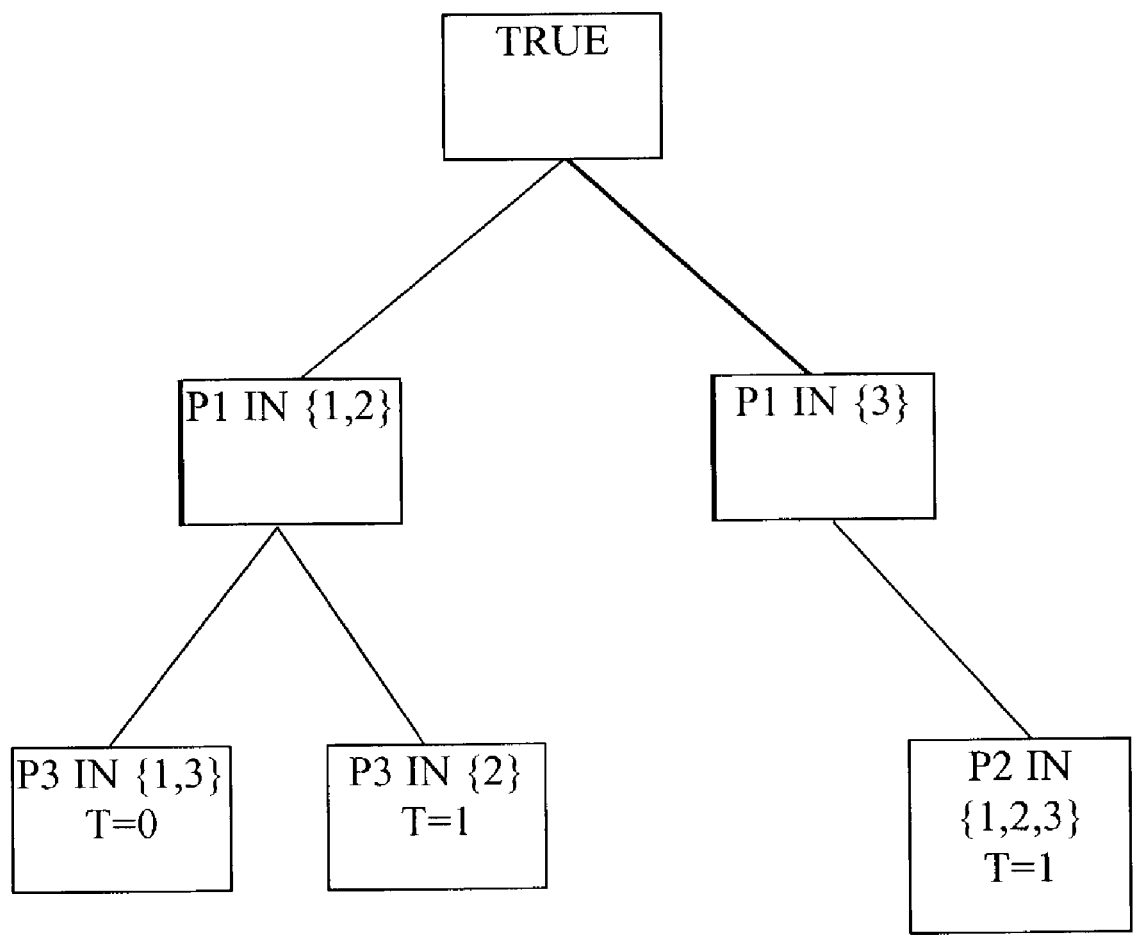
FIG. 15 is an exemplary decision tree constructed from a node consolidation result.

The purpose of the Adaptive Bayes Network (ABN) modeling is to provide a fast, scalable non-parametric means of extracting predictive information from a database with respect to a user-supplied "target". ABN provides a means to extract such information in the form of human-understandable rules and as a decision tree in addition to providing the basis for a graphic representation of discovered relationships. For example, these rules may have a form such as: If income is greater than $70K and household size is greater than 3, the probability of owning a late model minivan is 0.075. It is the transparency of the rule representation that is one of the main advantages of ABN compared to other types supervised learning techniques. The business-user, marketer, or business analyst can understand the basis of the model's predictions and therefore, be comfortable acting on them and explaining them to others.

ABN can be advantageously applied to a number of markets. For example, a market of interest is bioinformatics. Many problems in this realm can be cast as predictive modeling problems, such as finding gene markers for diseases. These problems are often characterized by data that have many thousands of predictors and very few rows, possibly less than 100. To handle these statistically difficult problems, ABN provides internal feature selection and a parsimonious view of the model complexity. The advantage of ABN in this realm is the potential for a parsimonious solution with human understandable rules.

Advantageously, the rules generated by ABN are an approximation to the scoring procedure. Each conditionally independent feature is a tree-like structure and for a given entity being scored, the "tree" has a rule. The entire model, which can consists of many such trees can then have many such rules applicable to an individual entity. The actual scoring procedure combines the features with the global prior in a Bayes product that is not typically comprehensible. However, as an approximation, one can consider the top m rules supporting the conclusion drawn by the actual scoring procedure. m is a user parameter, typically small, and the rules are typically shallow depth 1–4, leading to comprehensible supporting evidence for the conclusion drawn by the model with respect to an individual entity. ABN views these rules as "detailed rules". Each of these rules contain a set of IF . . . THEN conditions as described above, a probability for each target value and a count of instances matching the conditions and target value in the training data.

In contrast to the "detailed rules", ABN also produces aggregate rules. These rules are useful in understanding in a coarse way, how ABN makes its class assignments. The aggregate rules aggregate predictor values that lead to the same target class assignment. Rather than dilute the more focused probabilities associated with the detailed rules, the aggregate rules do not report probabilities or counts, only the predicted target value.

In addition to transparency, speed and scalability are also important reasons for using the ABN. The platform for the expression of tree and other mining algorithms is the database. The advantages of this platform are clear:
  closeness to the data
  the proliferation of the database infrastructure in the business marketplace Because the database is essentially a live organism inside the business infrastructure, data mining can become part of a feed back loop, that makes predictions, tracks actions and responses and adapts the model predictions on the basis of the actions and responses it sees. For such a loop to be efficient, the algorithms should, where possible, reside directly in the database. One possible means of accomplishing this goal is to re-express the base data mining algorithms in operations that are native to the database. Use of native operations, if effective, will create algorithms that:
  ride the database development wave
  minimize development time, quality control issues and maintenance cost.

This point of view favors algorithms that:
  create via SQL and its extensions (PL/SQL)
  characterizes sets with parameter aggregates
  makes efficient use of sets and set operations It discourages the use of cursors, and flexible procedural languages such as "C" that permit arbitrary structures and operations. Alternative approaches include more standard data mining algorithms that use:

- cursors, user-created structures, and C-like table functions, or,
- using a hybrid approach of database and non-database operations, or
- dumping the data into flat files or memory and thereafter using non-database operations Ultimately, questions of performance, of accuracy, of code simplicity and maintain-ability and the evolution of the database will determine the better approach. The approach described in this functional specification is a novel re-expression of the tree functionality in native SQL and PL/SQL.

Target Types

The target is a database field that is to be predicted by the Adaptive Bayes Network. Tree, like other Classification function algorithms, predicts binary or multi-class classification. Binary targets are targets that take on only two values, e.g., response/non-response to a promotion. Multi-class targets have more than two distinct values, e.g., product purchased. Note that multi-class target values are not assumed to exist in an ordered relation with each other, e.g. hair brush is not greater than comb.

For binary targets and multi-class targets, each partition predicts its majority (or plurality) class, and the confidence or estimate of probability associated with each class.

Tree is Inefficient in SQL

The standard tree algorithms are inefficient in SQL. The most expensive part of the decision tree build operation is the extension of the tree by splitting a node into two (or more) child nodes. From the standpoint of sets and set operations, the usual tree build methods are inefficient. At each recursive step, for each node on the fringe, we compute target aggregates (counts, means, and variances). The aggregates are in turn used to compute the decrease function values that are used to pick the best splitter. These computations maybe viewed as set operations on a number of sets approximately equal to the sum of the number of unique values of each predictor. This is a large number of sets and the associated table of aggregates can be very large and expensive to compute.

As expressed in SQL, this can involve the search for best split point for a given candidate predictor is represented by a self-join. Multiple nodes can be handled within the same query, if an external node table is maintained and is included in the join using a "group by node" clause. The number of self-joins is one per predictor per level. These self-joins obtain cumulative target statistics for each candidate predictor and potential split point (unique predictor value). The self-joins can be expensive. After each level the node table must be updated.

Using the Bayes Inverted Form

As an alternative, consider the Bayes inversion of the problem. The Bayes formula re-expresses the probability of the target conditioned on the predictors in terms of the probability of the predictors conditioned on the target. In simplest form, with a single predictor we have the following:

$$Pr(T=t|Pi=p)=Pr(T=t)*Pr(Pi=p|T=t)/Pr(Pi=p)$$

where:
T=target
t=a specific target value
Pi=predictor i
p=a specific value of Pi.

The Pr (T=t) is called the prior. It is the unconditional, i.e., global probability that the target takes on value 't'. This is an aggregate of the complete data. The second factor, Pr (Pi=p|T=t), is the "conditional probability" that predictor 'Pi' takes on the value 'p' given that the target takes on value 't'. Conditioning on the Target is equivalent to partitioning the complete data on the target. The conditional probability is the determined from histograms of predictor Pi conditioned on the target. A method for computing all histograms for each predictor, P1, P2, . . . , Pn at the same time in SQL is described below (Using Transactional Format). Thus, the complete set of aggregates required for choosing a splitter can be done efficiently. The Minimum Description Length (MDL) principle is used to evaluate and rank the alternative splits. In accordance with the MDL principle, the target field data will be "transmitted" from a sender to a receiver. The target data will be expressed as a model and its probability estimates are used as an ideal encoding of the data. The length of the theory is the bit length required to communicate the model using the "ideal" encoding. Details of the procedure are described in the design document.

The denominator, Pr (Pi=p), is ignored because it is a constant for all target values. Ultimately, the goal is to determine the probability of each of the target values conditioned on some predictor value. The probability of the predictor value is ignored, because presumably it has already occurred and now we seek the relative likelihood of each target value. Thus, the above equation is typically written as $$L(T=t|Pi=p) \sim Pr(T=t)*Pr(Pi=p|T=t)$$

where the '~' means proportional to and the result is a 'likelihood' rather than a probability. The probability is later extracted by normalizing each likelihood by the sum of the likelihoods:

$$Pr(T=t|Pi=p)=L(T=t|Pi=p)/\Sigma_j L(T=t|Pj=p)$$

With more than one predictor, the Bayes formula is extended as follows:

$$Pr(T=t|Pi=p,Pj=q) \sim Pr(T=t)*Pr(Pi=p|T=t)* Pr(Pj=q |T=t, Pi=p)$$

To extend the tree, we already have the first two factors. The third is obtained by partitioning both on the target and the previously chosen best split. The required statistics are histograms for each predictor for each partition. The same method for computing all histograms for each predictor, P1, P2, . . . , Pn at the same time in SQL referenced above applies at this next recursive step. Thus, again the complete set of aggregates required for choosing a splitter can be done efficiently.

In general, the Bayes formula is extended as follows:

$$Pr(T=t|Pi1=pi1, Pi2=pi2, \ldots, Pik=pik) \sim$$

$$Pr(T=t)*Pr(Pi1=pi1|T=t)*Pr(Pi2=pi2|T=t, Pi1=pi1)* \ldots *$$

$$Pr(Pik=pik|T=t,Pi1=pi1, \ldots Pik-1=pik-1)$$

For the general recursive step, we partition on all ancestor splits and compute the required histograms in a single pass. MDL is used to select best splitter at each step and to determine when to terminate. The recursive steps may be expressed in PL/SQL as a while loop.

Recall however, that one requirement is that accuracy must be at least as good as Naive Bayes. Naive Bayes models use all of the predictors. The greedy method described above may exclude predictors that are in fact informative. The algorithm is greedy because it chooses a single best split to extend the tree at any one iteration. How can we ensure that this algorithm will typically be at least as good as Naive Bayes? The simplest way is to first build a Naive Bayes Model (NB). If it is better than the baseline model (the global prior) as measured by MDL, then the NB becomes the new baseline. After the first feature is completely constructed, it is tested against the NB baseline using MDL. If the first feature is not better than the NB model, the algorithm terminates returning the NB model.

If the first feature is superior to the NB model, the array of seed trees can be extended one at a time in rank order using an outer PL/SQL loop. Each predictor will appear at most once, in at most one tree.

From the perspective of the Bayes formula we combine these trees as $$Pr(T=t|Pi_1=pi_1, Pi_2=pi_2, \ldots, Pi_n=pi_n) \sim$$

$$Pr(T=t)*Pr(Pi_1=pi_1|T=t)*Pr(Pi_2=pi_2|T=t, Pi_1=pi_1)* \ldots *$$

$$Pr(Pi_k=pi_k|T=t, Pi_1=pi_1, \ldots Pi_{k-1}=pi_{k-1})*$$

$$Pr(Pj_1=pj_1|T=t)*Pr(Pj_2=pi_2|T=t, Pj_1=Pj_1)* \ldots *$$

$$Pr(Pj_k=Pj_k|T=t, Pj_1=Pj_1, \ldots Pj_{k-1}=pj_{k-1})* \ldots$$

$$Pr(Pz_1=pz_1|T=t)*Pr(Pz_2=pi_2|T=t, Pz_1=pz_1)* \ldots *$$

$$Pr(Pz_k=Pz_k|T=t, Pz_1=pz_1, \ldots Pz_{k-1}=pz_{k-1})$$

This model form is known as a conditional independence model, where the trees are indexed as i, j ... z. The trees are conditionally independent of each other given the target. It is a generalization of Naive Bayes that may be viewed as an Adaptive Bayes Network. It is adaptive because the network structure is discovered by the algorithm using the data rather than, as is typical, user-specified.

But what is the quality of the conditional independence model after combining the feature tree factors as described above? How many feature trees should be included? Features are pruned from the array of trees using a stepwise MDL feature selection. Details of the procedure are described in the below. Error rates can be measured using leave-one-out cross-validation or, if there is sufficient data, test set validation described below (Measuring Errors).

As with Naive Bayes, the data must be binned. Binning is the process of grouping values, assigning each group a bin number and encoding the values with that bin number. Binning makes all data columns into multi-valued categorical. It enables the algorithm to predict both numeric and categorical target columns. It also makes histogram computation tractable. The splits described here are full fan-outs on the binned values of the predictors. Where are the simple rules that make tree an appealing, human interpretable model? A method for extracting rules from the Bayes Network is described below (Extracting Rules from the Bayes Network).

To return to the original issue, the Bayes Network computes aggregates in a single pass on partitioned set of data. Thus, the number of passes per tree is just the depth of the tree. This is far fewer set operations than would be required to build a standard tree. The split is a total fan-out on the small set of unique predictor values, so no computation is done to determine a best split. Extracting the rules is done after the array of trees is built. The determination of split assignment for this human readable form is done from the aggregates in the rules table. It is therefore very fast.

Scoring the Bayes Network involves assigning each row to the appropriate partitions to retrieve the Bayes probabilities. These assignments can be done in a loop level-by-level across all trees with a single query. The number of associated scans is the max depth of any feature tree in the array.

Features (v. Attributes)

As can be seen in the previous section, features are tree-like multi-attribute structures. From the standpoint of the network, features are conditionally independent components. Features contain at least one attribute (the root attribute). Conditional probabilities are computed for each value of the root predictor. A two-attribute feature will have, in addition to the root predictor conditional probabilities, computed conditional probabilities for each combination of values of the root and the depth 2 predictor. I.e., if a root predictor, x, has i values and the depth 2 predictor, y, has j values, a conditional probability is computed for each combination of values $\{x=a, y=b| a\epsilon 1, \ldots, i$ and $b\epsilon 1, \ldots, j\}$. Similarly, a depth 3 predictor, z, would have additional associated conditional probability computed for each combination of values $\{x=a, y=b, z=c| a\epsilon 1, \ldots, i$ and $b\epsilon 1, \ldots, j$ and $c\epsilon 1, \ldots, k\}$.

Using Transactional Format

Transactional format is a table expression of data, which consists of an ID, a name column and a value column. From a data mining perspective this data has a logical representation as a set of rows. Each row consists of set of columns. For supervised models, there is a special column called the target. The other columns are predictors. The model constructed from this logical representation uses the predictors to predict the target value. In the mapping from logical representation to transaction format, the ID is a row id, the name is the name of a logical column: predictor or target, the value is the value of the column at row specified by ID.

The advantages of transactional format are twofold. First, histograms can be obtained directly via a group by clause: create table partition_cnts as:
select     /*+    PARALLEL    USE_HASH(partitions training_table) */
partition_num, target_value, ANAME, VALUE, count(*) cnt
  from training_table c, partitions p
  where p.tid=c.tid
  group by partition_num, target_value, ANAME, VALUE;

In this query we need only keep track of the immediate ancestor partitioning, which is represented by partition_num and target_value. The histograms are computed directly. In addition, the number of columns that can be represented is not limited.

Requirements

Adaptive Bayes Network is a predictive data mining model. Its general requirements include the ability to build, test, evaluate, apply, display and persist a model and its related objects. Adaptive Bayes Network is a supervised learning module. Specific additional functionality required for Adaptive Bayes Network include:

a vector of target prior probabilities to account for discrepancies, if any, between the input data used for training and the population from which the training data were drawn a cost matrix, used to specify the relative importance to the user of the various categories of prediction errors, where an error category consists of a specific predicted target class and an actual target class There are also build termination criteria, including:

Maximum Network Feature Depth—Network Features are like individual decision trees. This parameter restricts the depth of any individual Network Feature in the model. At each depth for an individual Network Feature there is only one predictor. The required number of scans is equal to the sum of the depths of all constructed features. So the computational cost of multiple deep feature builds is high. The range for this parameter consists of the positive integers.

Maximum Number Of Network Features—the maximum number of seed features extended can provide a substantial performance improvement, especially in the instance of wide training tables. Note that the seed features are extended in rank order, and, in addition, the stepwise selection procedure proceeds in ranked seed features order. During stepwise selection, subsequent features must provide a statistical boost (as measured by MDL) relative to the current state of the model. Thus the likelihood of substantial benefit from extending later features declines rapidly.

Size of Naive Bayes baseline model: This parameter controls the size of the Naive Bayes Model constructed in the first step of the model build.

Maximum Consecutive Pruned Network Features—the maximum number of consecutive pruned features before halting the stepwise selection process. Negative values are used to indicate that only the Naive Bayes model and a single feature are constructed. If the Naive Bayes model is best, then it is selected. Otherwise, all as yet untested features are pruned from the final feature tree array.

Maximum Build Time—the maximum build time (minutes) parameter allows the user to build quick, possibly less accurate models for immediate use or simply to get a sense of how long it will take to build a model with a given set of data. To accomplish this, the algorithm divides the build into milestones (model states) representing complete functional models (see ABNModelBuildState for details). The algorithm completes at least a single milestone and then projects whether it can reach the next one within the user specified maximum build time. This decision is revisited at each milestone achieved until either the model build is complete or the algorithm determines it cannot reach the next milestone within the user-specified time limit. The user has access to the statistics produced by the time estimation procedure.

extracting the model rules. The rules may be extracted in a standard Decision Tree rules format: predictor-operator-value list. The rules are extracted as an array of possibly shallow trees.

extracting the Bayesian Network. The network consists of an array of conditionally independent network features. The Network Features are products of conditional probability expressions. The Conditional Probability Expressions contain a Consequent, an Antecedent, a count and a probability. Each Adaptive Bayes Network contains a special Network Feature, termed the Target Prior. The Target Prior is the global (unconditional) probability of the various target values. Extending the definition of a conditional probability to be a probability conditioned on zero or more conditions, the Target Prior can be viewed as a conditional probability with zero conditions. Thus, the Target Prior is represented as a single Conditional Probability Expression containing a Consequent with no antecedent attributes. The Antecedent of the Target Prior is empty.

Adaptive Bayes Network's additional mining settings allow the user to communicate to the model build process sampling characteristics of the training data (prior probabilities), the relative importance of the various target values (cost matrix) and to control build performance and trade-off build time v. accuracy. Model rules extensions are to enable the user to view and make sense of the model.

Functionality

This section explains in more detail the Adaptive Bayes Network-specific functional requirements mentioned above and their use.

Cost Matrix

The user may specify cost matrices. From the user viewpoint it may be that not all misclassifications are equal. In a medical problem, predicting no reaction, when death occurs is a much more serious error, than predicting a mild reaction when no reaction occurs. Or, in a marketing application that is intended to promote sale of a product, given the cost of the promotion and the potential revenue from a sale, it may be 10 times worse to misclassify a potential positive respondent than to misclassify a non-respondent. A NULL cost matrix indicates that all misclassifications are to be counted as equally important. The cost matrix is used by the apply operation to produce the "minimum cost" prediction and by the build operation in the construction of the aggregate decision tree rules.

Priors

Class priors are appropriate to classification targets only. Class priors are the prior probabilities assigned to each target class. They act as a weight assigned to each entity based on the value of the target. The reason for making use of this feature is to overcome a known bias in the sampling procedure used to collect the data presented to the model. Suppose there are two target classes, responders and non-responders. Suppose that responders make up only 1% of population. For reasons of cost, convenience or because of the rarity of the responders, the data might be collected such that it consists of 50% responders and 50% non-responders. I.e., the responder population has been over-sampled. To allow the model to correct for this condition, the user may specify a priors vector. As a convenience, when no known sampling bias exists, the user may specify the priors as NULL, indicating to the algorithm that the priors are to be constructed internally from the training table data.

Extracting the Model Rules

The rules and the Bayes Network are useful for assisting human comprehension of the model findings. In standard decision, tree format, the predicate rules can be extracted from each of the extended features. The rules come in two flavors:

1. detailed rules:
2. aggregate rules:

as described above.

The Bayes Network has become a popular statistical prediction tool. Graphical representation of the network can also help human comprehension of the model findings.

Build Termination Criteria

The build process includes a step that finds an array of seed features. These are training data columns that are statistically correlated with the target. In a wide training table, with many columns, many seed features may be found. The statistical procedure ranks the seed features with respect to their statistical correlation. Subsequent steps extend each seed feature one at a time in rank order. Each time a seed feature is extended, it involves a scan of the table.

To control the length of time it takes for the build, there are three user parameters: maximum tree depth, maximum number of seed features extended, and maximum build time.

For deep data sets (many rows or transactions), the maximum tree depth setting will limit the number of scans per feature extended.

Limiting the number of seed features that are extended via the maximum number of seed features extended can provide a substantial performance improvement, especially in the instance of wide training tables. Note that the seed features are extended in rank order, and, in addition, the stepwise selection procedure proceeds in ranked seed features order. During stepwise selection, subsequent features must provide a statistical boost (as measured by MDL) relative to the current state of the model. Thus the likelihood of substantial benefit from extending later features declines rapidly.

The maximum build time allows the user to build quick, possibly less accurate models for immediate use. To accomplish this, the algorithm divides the build into milestones (model states) representing complete functional models:

- Naive Bayes Model: the model consists of a subset of (single-predictor) features that individually pass MDL correlation criteria. No MDL pruning has occurred with respect to the joint model.
- Single partially-complete MDL-pruned feature: the model consists of a single feature of at least depth 2 (2 predictors) but the attempts to extend this feature have not terminated
- Complete single feature: a single feature has been built to termination
- Multiple feature model: multiple features have been tested for inclusion in the model, MDL pruning has determined whether the model actually has 1 or more features. The model may have terminated either because there is insufficient time to test an additional feature or because the number of consecutive features failing the stepwise selection criteria exceeded the maximum allowed.

The algorithm outputs its current model state and statistics that provide an estimate of how long it would take for the model to build (and prune) a feature. Future version of ABN will include a continueBuild operation that will enable both incremental improvement of the current model based on a static set of training data and incremental learning based on dynamic training data.

Stepwise Selection Termination Criteria

The stepwise selection procedure is used to prune features that do not contribute to the statistical accuracy of the target predictions. However, even with restrictions on the number of features extended and the depth of trees, this stepwise selection procedure can be expensive. The features are ranked statistically. The stepwise procedure adds the features to the model one at a time, in rank order. The cost to enter a new feature into the model rapidly goes up as features are added. The barrier to entry is greater and the likelihood less as the process continues. Hence, to avoid wasting expensive computation, the stepwise selection procedure is terminated when a number of consecutive features have failed the stepwise selection test. All features of lower rank are then pruned along with any other features that have failed stepwise model selection criteria. The algorithm also includes a test to see whether a new feature should replace the complete current model state, since the greedy procedure makes this a possibility. This feature of the algorithm when combined (in the future) with incremental learning will enable the model to be adaptive to changes in input. The model will then be able to both modify the parameter estimates associated with its current structure and abandon its current structure for one better adapted to the current input.

ABN Design

ABN Description

This section describes the implementation of the PL/SQL build and apply operations.

Build Operation

The build operation constructs a generalized conditional independence model for a description of this model form. It proceeds by first using a statistical procedure, Minimum Description Length (MDL), to find which predictors are correlated to the target column (see Using MDL to Construct Conditionally Independent Components). If the algorithm stopped after finding the correlated predictors, and used the selected predictors in a Bayes model, the model so constructed would be a Naive Bayes model with embedded feature selection.

Note that the predictors are binned. The statistical procedure compares the histograms of the target within predictor bin value to the global target. These within-bin histograms represent an array of one-variable predictive models. The statistical procedure is capable of model comparison for predicting the target. Hence, the result of the MDL computation is to rank the predictors.

For purposes of the MDL computation, from the histograms, the probabilities of target value (T) conditioned on predictor value (P1) are obtained. These probabilities are estimated as the proportions of each target value within a given predictor bin value, for example, as shown in FIG. 1. The notation "Pr (T|P1)" is read the probability that the target value =<listed target value> on condition that the predictor value =<listed predictor value>. As shown, probabilities that sum to 1 are grouped.

The same set of counts is used to compute the probability of the predictor conditioned on the target value, the Bayes inverted form, which is required for the final model. Thus, rearranging FIG. 1 yields FIG. 2. The notation "Pr (P1|T)" is read the probability that the predictor value =<listed predictor value> on condition that the target value =<listed target value>. Note that the Target has a global distribution, as shown in FIG. 3.

The corresponding Bayes model is:

$$Pr(T|P1) \sim Pr(T)*Pr(P1|T)$$

As an example computation:

$$Pr(T=1|P1=1)=Pr(T=1)*Pr(P1=1|T=1)/(Pr(T=1)*$$
$$Pr(P1=1|T=1)+Pr(T=0)*Pr(P1=1|T=0)=$$
$$0.722222*0.615385/$$
$$(0.722222*0.615385+0.277778*0.4)=0.8$$

Note that in this simple (no conditional independence assumption) case the Bayes computation is just another method of computing the probabilities (using the values in Tables 1b and 1c to compute the values in Table 1a). The real utility of the method is only apparent when computing in high dimensional spaces. In such spaces, the data become sparse and histograms cannot be constructed for all multi-dimensional cells, i.e., it is not possible to directly estimate Pr(T |P) where P is a vector. The conditional independence assumption permits the computation of probabilities where the data is sparse and histograms cannot be constructed. E.g., suppose there are two conditionally independent components:

$Pr(P1|T)$ and $Pr(P3|T, P2)$ then under conditional independence, the Bayes Model would be:

$Pr(T|P1, P2, P3) \sim P(T)*P(P1|T)*P(P2|T)*P(P3|P2,T)$

The Search for the Best Model

ABN constructs and evaluates a series of candidate models. As a preliminary step, each predictor is used as a simple single-predictor model. MDL is used to rank these models and, implicitly, the predictors. Then a Naive Bayes Model (NB) is constructed using the top K predictors according to the ranked predictor list. K is a user-parameter: Maximum Number Of Network Features. If this model is better, as measured by MDL, than the global prior, then it becomes the new baseline. The size of the NB model is restricted to prevent instability in the probability estimates in the face of large numbers of predictors, many of which may be uncorrelated to the target.

The next step is to extend the best one-variable model, if possible to a two-variable model. For this, target (T) histograms are constructed for each existing combination of predictor values. In this next iteration, MDL is used to compare the new baseline model, P1 only, shown in FIG. 1, with a more complex model, P1 and P2, shown in FIG. 4. The Bayes probabilities associated with this more complex model are computed from the same set of counts and are displayed FIG. 5.

Subsequent steps attempt to extend the best two-variable model until termination where the baseline model has a smaller description length than any candidate extensions. At this point a conditionally independent component has been constructed. The predictors that are part of this component are excluded from consideration as one-variable models and as predictors within other components. The algorithm then attempts to extend the next best one-variable model. After this process has terminated, either because of a user setting limiting the number of attempted extension or because there are no more one-variable models to extend, the complete conditional independence model is pruned using MDL (see section Pruning Using MDL).

Zero Count Cells

Zero counts are common in the multi-dimensional histograms that are constructed by this algorithm. There are practical SQL issues concerning dealing with the zero counts and issues with respect to construction of the Bayes probabilities. This is illustrated consider in FIGS. 6–8. For example, in FIG. 6, the notation "Pr(T|P1)" is read the probability that the target value=<listed target value> on condition that the predictor value=<listed predictor value>.

Note that if SQL is used to simply counts the co-occurrences via joins, then the zero cells will not be represented (for example, the 5th row of FIG. 6). In addition, logs of probabilities are used, both for reasons of scaling, and because extended product computations are not supported by SQL. The log of 0 is not defined.

There are two apparent problems for the Bayes probabilities, shown in FIG. 8. First, the conditional probabilities Pr(P2=0|P1=2, T=0) and Pr(P2=1|P1=2, T=0) are undefined. Second, the conditional probabilities Pr(P2=0|P1=2, T=1) and Pr(P2=1|P1=2, T=1) are unrealistic. Adding the global probabilities for P2, as shown in FIG. 9, to the counts, as shown in FIG. 10, can ameliorate both problems.

Note that the effect is to shrink the conditional probabilities back to the prior for P2. In the special case where P2=0 and P1=2, there are no instances of either T=0 or T=1. The corresponding conditional probabilities are equal. There is no information about the target when P2=0 and P1=2 and the Bayes probabilities reflect that.

$$P_T(T = 0 | P1 = 2, P2 = 0) = P(T = 0) * P(P1 = 2 | T = 0) *$$
$$0.583783784 / (P(T = 0) * P(P1 = 2 | T = 0) *$$
$$0.583783784 + P(T = 1) * P(P1 = 2 | T = 0) *$$
$$0.583783784)$$
$$= P(T = 0) * P(P1 = 2 | T = 0 / (P(T = 0) *$$
$$P(P1 - 2 | T = 0) + P(T = 1) *$$
$$P(P1 = 2 | T = 0))$$

These adjustments to the counts are simply used to compute the probabilities. The original counts are maintained for other computations. The conditional probabilities are realistic with respect to the information in the counts. The probabilities are no longer 0, thus the log function is defined.

Pruning And Termination Conditions

MDL has been used to construct conditionally independent components which, individually, correlate with the target. The details are described in the section Using MDL below. This section answer the following questions. How does the conglomerate Bayes Model perform? Do additional components increase or decrease predictive accuracy? The task of the pruning phase is to select the best subset model.

Note that the seed features are ranked. Also note that the first seed feature is more strongly correlated than all the other seed features. Furthermore, its extensions are better than it is. With a single feature (no conditional independence components) the Bayes computation is a straight-forward probability computation. If the first feature is better than the Naive Bayes model then it becomes the new baseline. Otherwise the build process terminates and the Naive Bayes model is returned.

The algorithm, if not terminated, then extends the remaining seeds one at a time in rank order. Each feature is extended as far as MDL pruning or the maximum depth parameter permits (like the first feature). Then MDL is used to test whether the new feature should augment the current model or replace the current model altogether. If at any point the number of consecutively rejected seed features is equal to the (user-selectable) maximum allowed, then the build process terminates. Other termination conditions include a limit on the number of accepted (possibly extended) features, having insufficient time to complete the next build milestone and exhausting the list of available seed features during the search. Rejected seed features are deleted from the model.

When a user-selectable number of components have been rejected, all lower ranked features are deleted from the model and the pruning process terminates.

Using MDL

The minimum description length (MDL) principle states that the most likely model is the model that minimizes the sum of the length of the theory and the length of the data encoded using the theory for the data. Length is measured in bits to transmit the target value. The approach used here is an extension of a two-stage encoding method.

Transmitting the Targets

The simplest such model transmits a target value by first transmitting the target probability and then coding the target in accordance with the probability distribution. The most efficient encoding requires $-\log2(p)$ bits (Shannon's Noiseless Coding Theorem). The average cost to transmit a target is its entropy $=-p^* \log2(p)$. The total cost of transmission is $-N^*\Sigma p^* \log2(p)$, where N is the number of targets to be transmitted.

Transmitting the Model: the Size of the Candidate Model Set

One way to transmit the model is to:
- construct a code book consisting of the model candidates which both sender and receiver have available
- assign each candidate model a number
- transmit the number of the model to the receiver Suppose the target is binary. If there are N target values to be transmitted, then there are N+1 possible values of the observed $p=k/N$, $k \in \{0,1, \ldots, N\}$. Thus, there are N+1 possible models distinguishable in data (whatever the algorithm used to construct such models). Thus, assuming apriori, that all possible observed k are equally likely, transmitting the model requires $\log2(N+1)$ bits.

The extension to multiclass targets is a standard combinatorics problem: the number of combinations of a given length (N) using elements of a given set (m target values) allowing repetition (repeated target values) and missing elements (0 instances of one or more specific target values). The solution to this combinatorics problems is $$(N+m-1)!/\{(m-1)!(N)!\},$$

which in the binary case is:

$$(N+2-1)!/\{(2-1)!N!\}=(N+1)!/\{1!N!\}=N+1.$$

Thus, in general transmitting the model requires:

$$\log2((N+m-1)!/\{(m-1)!(N)!\}) \text{ bits}.$$

For a binned predictor, with j unique values, we have j submodels. Transmitting the j submodels requires:

$$\Sigma_j \log2((N_j+m-1)!/\{(m-1)!(N_j)!\}) \text{ bits}.$$

For a multidimensional feature with n predictors, with $j_n$ unique values each, we have $\pi_i j_i$ submodels, one for each of the multidimensional cells. Transmitting the $\pi_i j_i$ submodels requires:

$$\Sigma_{h \in \pi_j} \log2((N_h+m-1)!/\{(m-1)!(N_h)!\}) \text{ bits},$$

where $h \in \pi_j$ indexes the multidimensional cells.

Transmitting the Model: Specifying the Model Predictors

The model contains 1 or more predictors. To transmit the model, the predictors used by the model must be transmitted. The predictors are encoded using an ideal encoding associated with their prior probability of inclusion in the model.

Note that for a fixed N, the larger the number of partitions (bins or multidimensional cells), the greater is the size of the candidate model set. Hence all predictors are not equally likely apriori. Predictors with fewer bins, lower entropy or more missing values are less likely apriori, because these predictors have smaller associated candidate model sets. The prior probability, $p_k$, of each candidate predictor, k, is computed as the size of its candidate model set divided by the sum of the sizes of the candidate model sets of all predictors. Transmitting candidate predictor k requires $-\log p_k$. Less likely predictors are penalized. Note, this approach has the benefit of penalizing predictors with a large percentage of missing values.

Some datasets, such as bioinformatics problems, may have data which is very wide (many predictors) and shallow (few rows). To prevent the cost associated with specifying model predictors from swamping the benefits, the algorithm does internal predictor selection. The top m ranked predictors (see Using MDL to Rank the Predictors below) are selected for consideration by the model build, the others are ignored. The predictor "encodings", $-\log p_k$, are updated to reflect the selected predictors. A user parameter, specifies the value of m.

However, in extreme circumstances, such as the bioinformatics problems described above, the value of m can be over-ridden by the algorithm. The algorithm computes the difference between the global model target entropy and the target entropy associated with the best single predictor model. It considers this difference as a crude estimate of model potential benefit, B. It sets a threshold on the maximum number of allowed predictors such that the number of bits associated with specifying a predictor is a fraction, f, of the model potential benefit. The algorithm then the model potential benefit in terms of a maximum number of allowed predictors, $n_p$:

$$fB=-\log2(1/n_p).$$

If $n_p > m$ then the algorithm sets $m=n_p$.

Using MDL to Rank the Predictors

The description length is computed for each predictor as a single predictor model. The description length is the sum of the bit cost to transmit the targets, the candidate model (size of the candidate model set) and the predictor name, $-\log p_k$, (see Transmitting the Model: Specifying the Model Predictors above). The sum of the within-bin entropies is used to compute the bit cost to transmit the targets:

$$\text{predictor } k\text{'s description length}=-\Sigma N_j p_{ij}^* \log2(p_{ij})+\Sigma_j \log2((N_j+m-1)!/\{(m-1)!(N_j)!\})-\log p_k$$

The predictors are then ranked by description length from smallest to largest.

Using MDL to Construct Conditionally Independent Features

Features are constructed by attempting to extend single predictor, seed features in rank order. For a predictor to be a seed feature, it must have a description length smaller than the baseline model. The baseline is the global distribution of the target. The baseline description length is the sum of the bit cost to transmit the targets using the global distribution and the candidate model.

$$\text{Baseline Description Length}=-\Sigma \log2(p)+\log2((N+m-1)!/\{(m-1)!(N)!\})$$

A seed feature's description length becomes the baseline for the full feature: (see Using MDL to Rank the Predictors above). The algorithm searches through each candidate extension predictor looking for the two-predictor feature with the smallest description length. The candidate extension has a description length consisting of the sum of the target entropies in its multidimensional cells (transmission of targets), the log2 of the sum of the cardinalities of the candidate model sets in its multidimensional cells (transmission of model) and the cost to transmit the name of the candidate predictors (seed and current extension).

If no candidate extension is smaller than the current baseline, then the extension process terminates and a new seed may be considered. Otherwise, the smallest description length candidate becomes the new feature baseline.

Using MDL to Evaluate the Product of Conditionally Independent Features

The MDL components of a conditional independence product model include:

- transmitting the targets
- transmitting the model
- transmitting the predictors
- transmitting the feature boundaries (which predictors are in which feature)

Transmitting the targets is again done via an "ideal" encoding. The model is used to score a sample of the training records. Sampling is used for performance reasons, since the algorithm may be forced to score the training data multiple times. The cost to transmit a target is $-\log2(p)$, where p is the model predicted probability of the actual target value. Note that poor predictions have high transmission costs. Predictions with probabilities close to zero have costs approaching infinity and predictions close to 1.0 have 0 costs. It is reasonable to assume that the precision of the probability estimates cannot exceed 1/sample size. Thus, using a Laplacian smoothing of the probabilities the minimum and maximum values of p are forced to:

$$p_{min}=1/(\text{sample size}+\text{number of target values }-1)$$

$$p_{max}=1-p_{min}$$

respectively.

Transmitting the predictors is done using the encoding scheme described in the section, Transmitting the Model: Specifying the Model Predictors, above. However, for the Naive Bayes Model, there is no need to transmit a predictor list, since all predictors are included in the model (after what is taken to be an external feature selection step).

Transmission of the feature boundaries is accomplished as follows. The predictors are specified in feature and depth order, with 2 additional stop bits between successive features. However, for the Naive Bayes Model, there is no need to transmit feature boundaries, since boundaries exist between all.

Transmitting the Model

In evaluating the complexity of the candidate set associated with a model that is the product of conditionally independent features, it is necessary to move away from the "communication" MDL paradigm. The communication paradigm vastly overrates the cost of this type of model, which as the number of elements in product increases, goes rapidly to infinity. A good model, whose model transmission cost is highly overrated may be de-selected during the model selection procedure. Instead considerations of the information in the model set are used to place limits on the complexity of this type of model (paper to follow with justifications). The MDL principle minimizes the sum of the information in the model concerning the order and values of the target and transmission cost using the model. From this perspective, a conditionally independent product model has as much information with respect to the ordering and values of the target as its largest single component. The argument for the multiclass case is similar.

Apply

Each conditionally independent feature has conditional probability predictions for each target value indexed by a multi-dimensional predictor vector. The number of dimensions varies by depth. At the root there is only one vector component. At depth 2 there are 2 vector components, etc. Scoring is done via a loop over component depth. The model representation needs to be structured to support scoring. Note that for each component at each depth all that is required to score a transaction is to match a condition on the predictor at that depth for that component AND to know to which immediate parent the transaction belongs. The parent, constructed in a similar manner, encodes all the ancestral information. Recursion is implicit in the breadth-wise loop. For this purpose, the notion of a block and a parent block number are used.

The block is a numeric (linearization) encoding of the multi-dimensional vector. The parent block is the same encoding applied to the parent. A sequence is used for creating the encoding. To illustrate, suppose I have a single component with two predictors, each with three values. Note that block 1 is reserved for the global target distribution. At depth 1, the block numbers might range from 2–4, each with a parent block of 1. At depth 2, we have 3 possible predictor values for each of three possible parents. Thus there are 9 required block numbers at depth 2, ranging from 5–13. Blocks 5–7 would have parent block 2, blocks 8–10 would have parent block 3 and blocks 11–13 would have parent block 4.

The columns in the model table include those shown in FIG. 11. The LOG2_P column is a computational convenience, to avoid on-the-fly transformations. Transfer to the log scale avoids underflow and transforms product computations into sums. The TARGET_PROBABILITY column is kept as a convenience for the construction of the rules tables.

To apply, the apply table is joined to the model table in a loop over depth. At depth 1, the join matches predictor and predictor value to item column name and item column value in the apply table. The result is inserted into an assignment table. The assignment table contains the transaction id (from the apply table), and all of the tree table columns. At subsequent steps the join also includes the assignment table sub-selected for parent depth. Here we have additional equi-join conditions between the assignment table and the apply table on transaction id, and between the assignment table, a, and the model table, m:

a.BLOCK_NUM=m.PARENT_BLOCK_NUM and a.TARGET_VALUE=m.TARGET_VALUE

This identifies the specific parent block of each transaction id, which, in turn, makes the current block number well defined.

Next shifted (to avoid underflow) raw scores are created by summing the LOG2_P grouped by transaction id and target value. To this sum the (log) prior (probability) for each target value is added. This sum is the raw Bayes likelihoods for each target value on the log scale. These likelihoods are transformed by a power function to the original scale and normalized (divided by the sum of the likelihoods over the target values) to produce predicted probabilities for each target value. The results are inserted into a results table.

Apply with Rules

For some applications, users would like to understand the reasoning behind the model prediction. With complex conditional independence product models, this can be difficult. As a rough approximation intended to provide human insight, for a given target prediction, the individual product components can be ranked with respect to the degree to which they support that prediction. If the rules are assigned IDs then, the rule IDs can then be returned in rank order along with the target prediction, probability or cost and supplemental data.

Note that the model table contains the target value, the target probability and the count for each block. Thus, the block numbers are used as rule IDs. Apply returns the ids of one more rules that have the highest probability or lowest cost with respect to a specific target value or set of target values depending on the apply type specification. The number of rules is user-specified. In addition there is a PL/SQL function for obtaining the metadata associated with these rules:

the rule (as a string)
a list of target values, associated probabilities and count of rows matching the rule and target value in the training data The function has the signature:
PROCEDURE get_detailed_rule(
    p_rule_id INTEGER,
    p_trees_table_name
      odm_model_util.TABLE_NAME_TYPE,
    p_rule_string IN OUT VARCHAR2,
    p_target_val_list IN OUT STRVAL_LIST_TYPE,
    p_target_prob_list IN OUT NUM_LIST_TYPE,
    p_rule_count list IN OUT NUM_LIST_TYPE);

Mining Rules

The predicate mining rules that characterize a decision tree are conjunctions of simple predicates. The ordering of the conjunctions define paths in the tree. Nodes in the tree are defined as satisfying a complete set of ancestral predicates.

Note that the individual conditionally independent components (feature trees) already represent structures of this type. Individual rules (paths through the tree) are conjunctions of predictor-value pairs, one pair at each depth. The number of such rules is the product of the number of unique values of each predictor in the feature tree. The problem is that this representation is not compact. It is hard to visualize and interpret. A more compact representation is constructed using the following mechanism. For each feature tree to be represented, a table is constructed that that contains the values of the feature predictors and the associated minimum cost (see Use of Cost Matrix and Prior Probabilities below) target class. The required inputs to construct this table are the Model table and the Cost Matrix table, if it exists. This table is then consolidated in a stepwise fashion. From the consolidated table a tree is constructed.

The algorithm proceeds by first consolidating root node values. For a pair of root node values to be consolidated, all of their downstream conditions must lead to the same target values. To illustrate, suppose a starting table as shown in FIG. 12, where P1 is the depth 1 (root) predictor and P2 is the depth 2 predictor. Note that P1=1 and P1=2 have the same downstream behavior:

when P2=1, T=0
when P2=2, T=1
when P2=3, T=2

P1=3 has different downstream behavior. Thus P1=1 and P2=2 can be consolidated. This can be detected using the following illustrative SQL:

```
create table cons_lev1_grps as
select P1_1, P1_2 from
    (select min(P1_1) P1_1, P1_2 from
        (select P1_1, P1_2 from
            (select P1 P1_, p2, t from table_5a) a,
            (select P1 P1_2, p2, t from table_5a) b
            where a.p2=b.p2 AND a.t=b.t AND a.p1_1
                <=b.p1_2
        MINUS
        select P1_1, P1_2 from
            (select P1 P1_1, p1, p2, t from table_5a) a,
            (select P1 P1_2, p1, p2, t from table_5a) b
            where a.p2=b.p2 AND a.t !=b.t AND a.p1_1
                <b.p1_2)
    group by P1_2);
```

When the associated consolidation is performed, the result is as shown in FIG. 13.

Note that for the consolidated group P1=1 and P1=2, the downstream behavior of P2=1 and P2=3 is that T=0. Hence, P2=1 and P2=3 can be consolidated. P2=2 has different downstream behavior, T=1. In addition, for the consolidated group P1=3 all values of P2 lead to T=1, thus P2=1, P2=2 and P2=3 can be consolidated. The result is as shown in FIG. 14. These grouping can be detected using the following illustrative SQL:

```
create table cons_lev2_grps as
select P0_1, P2_1, P2_2 from
    (select P1_1, min(P2_1) P2_1, P2_2 from
        (select a.P1_1, P2_1, P2_2 from
            (select P1_1, p2 P2_1, t from table_5a c,
                cons_lev1_grps g where c.P1=g.P1_2) a,
            (select P1_1, p2 P2_2, t from table_5a c,
                cons_lev1_grps g where c.P1=g.P1_2) b
            where a.p1_1=b.p1_1 AND
                a.t=b.t AND
                a.p2_1<=b.p2_2
        MINUS
        select a.P1_1, P2_1, P2_2 from
            (select P1_1, p2 P2_1, t from table_5a c,
                cons_lev1_grps g where c.P1=g.P1_2) a,
            (select P1_1, p2 P2_2, t from table_5a c,
                cons_lev1_grps g where c.P1=g.P1_2) b
            where a.p1_1=b.p1_1 AND
                a.t !=b.t AND
                a.p2_1<b.p2_2)
    group by P1_1, P2_2);
```

To facilitate consolidation, rules with no support in the training data are not allowed to impede consolidation. This is achieved by maintaining the counts in the table (illustrated in FIG. 12) and applying a where clause that eliminates 0 count rules.

A decision tree can be constructed from the table shown in FIG. 14, as shown in FIG. 15. The decision tree shown in FIG. 15 can be represented in a database using three data tables:

1. Parent_Child_Table with columns: tree_number, parent_node, child_node, target_value
2. Node_Table with columns: tree_number, node_id, target_value, predictor_name
3. Value_Table with columns: tree_number, node_1d, predictor_value These tables will contain the metadata used by the Java API call to construct the decision tree Java objects. The Parent_Child table specifies the parent-child links. The parent of any node in the Node_Table can be found via an equi-join between these two tables where node_id=child_node. The join of the Value_Table to the Node_Table is many to one.

These tables are constructed from the model table as follows. Node_Ids are created using a sequence. The ids are created for each feature (tree) as if the tree were full. E.g., if there are k unique target values, then a feature of depth m, requires k $^m$+1 ids. The ids are created in a loop from depth 1 . . . m for each tree, where at each level k values are added per node_id at the previous level. This constructs the Parent_Child_Table. The initial table creation begins with a single (root) node. At the outset of each new tree a root node is inserted.

The Node_Table is created by a join of the Parent_Child_Table, p, with the model table, m, where the following condition limits the output of the model_table prior to the join : select distinct tree_number, target_value, predictor_name from model_table. The following clause restricts the join: where p. tree_number=m. tree_number AND p. target_value=m. target_value.

To create the Values_Table, a table that enumerates the list of vectors of predictor values for each predictor in each feature tree. The table is then scored using the apply operation and the predictor values are assigned in accordance with the posterior probabilities and, if it exists, the cost matrix. Note that target and categorical predictor values are replaced with their un-binned (string) representation where such exist. Numeric predictor values associated with contiguous bins are merged to simplify the rule, e.g.:

Age In {"20–30", "30–40", "60–70"}=>"Responder"

becomes:

Age In {"20–40", "60–70"}=>"Responder".

Use of Cost Matrix and Prior Probabilities

A cost matrix is a means by which the user can express preference for one target class over another. To illustrated its' use, suppose there is a cost matrix which weights the cost of an error when T=1 as 1 and when T=0 as 3. Then the estimated posterior cost is shown in FIG. 16 and is derived from the example in FIG. 1. Here we see that the lowest cost prediction when P1=0 is T=0 and the lowest cost prediction when P=1 is T=1. With a user-supplied cost matrix, the model predicts the lowest cost target value. If no cost matrix is supplied the default is a "unit" cost matrix. This cost matrix has 0's on the diagonal and 1's on the off diagonal elements. I.e., the cost of an error is 1, regardless of actual or predicted target class. With the default (unit) cost matrix, the model predicts the target class with the highest posterior probability.

The prior probabilities specification is a means to allow the user to indicate that the training data were selectively sampled. Prior probability vectors, where supplied, modify the sample priors and the internally computed block counts. The supplied probability vectors replace the sample priors. In addition, the supplied probability vectors are applied as a set of normalized weights to the block counts computed during the build operation. To illustrate, suppose a binary target has been supplied with the following prior: {0.05, 0.95} and the sample global distribution is {80, 120}. Then implicitly each example has a weight depending upon the target value as shown in FIG. 17.

Note that the effect of the weights on the global sample makes the distribution:

80*0.125=10

120*1.583333=190 matching the user supplied prior.

If the table name referencing the prior probabilities is empty, the algorithm computes the sample priors and returns the resultant table.

The impact of these weights on the internal computations is illustrated in FIGS. 18 and 19 derived from the example used to compute the tables shown in FIGS. 1 and 2. The weights greatly affect the probabilities of Target conditioned on the predictor(s), as shown in FIG. 18, used in the MDL computation, but have no affect on the probability of the (current) predictor conditioned on the Target and the ancestor predictors, as shown in FIG. 19, used in the Bayes probability computation. For the Bayes probability computation, the impact is felt entirely through the prior.

ABN Inputs

Build

An exemplary implementation of ABN processing includes the following PL/SQL inputs to the build operation:
    name of the training table
    name of the transaction id column
    name of the predictor name column
    name of the value column
    name of the target
    name of the model table
    name of the cost matrix table
    name of the priors table
    name of the Parent_Child_Table
    name of the Node_Table
    name of the Value_Table
    MaximumNetworkFeatureDepth
    MaximumNumberOfNetworkFeatures
    MaximumConsecutivePrunedNetworkFeature
    MaximumBuildTime The training table is the table containing the data used to build the model. The transaction id is the name of the column identifying a logical data row in 2-D format. The predictor name and value columns are transactional format representations, the former being the name of the predictor and latter its value. The target is the name of the (logical) column to be predicted. The model table is the result object produced by the build operation.

Cost Matrix is a table with 3 columns: Predicted_Value, Actual_Value, Cost of type NUMBER. Predicted_Value and Actual_Value are binned target values and cost is the user-assigned cost of an error. This is a small, temporary structure created and passed to the build operation from data in the corresponding Java object. Its purpose is to transmit to the model build and apply operations the users subjective relative value of a prediction error. See for details on use and function. This is an N * N table where N is the number of unique target values. It is optional. The default table has 0's on the diagonal (Predicted_Value=Actual_Value) and 1's on the off-diagonal elements (Predicted_Value!=Actual_Value).

The priors table has 2 columns: Target_Value, Prior_Probability of type NUMBER. Target_Value is the value of the target and Prior_Probability is the global probability of that target value.

The last three inputs are configuration parameters to control build performance.

ABN Processing

Build

An exemplary implementation of ABN processing includes a build operation having the following high level structure:

```
Validate and Initialize
create_seed_feature_trees
IF Model_Table IS empty Then
    drop Model_Table;
    Throw e_model_is_empty_num exception
    RETURN
END IF;
terminate=FALSE;
test whether user's feature selection parameter (max num-
    ber of predictors) is too high
perform feature selection
create_naive_bayes_model;
IF Naive Bayes model has smaller description than global
    prior model THEN
    baseline=Naive Bayes model
END;
select top m features;
update table specifying predictor cost to reflect feature
    selection;
/* Extend the first feature tree */
While terminate=FALSE LOOP
    Find Best Predictor
    If NULL Then terminate=TRUE
    Swap ID mapping tables[1] in preparation for the next
        iteration
END LOOP
Compute MDL score of the first model
IF First Feature has higher MDL score than current
    baseline
    Terminate returning Naive Bayes model
END IF;
Find Next Seed Feature to Extend
IF NOT NULL THEN
    WHILE
        v_current_num_trees<v_maximum_num_trees
        LOOP
        WHILE
            v_current_depth<=v_maximum_tree_depth
            LOOP
            extend (add predictor to) current feature to next
                depth
            if no extension possible then exit
            END LOOP
        test whether current extension provides a lower cost
            MDL model
        if NOT then
            re-activate extension feature as a seed feature
            exit
        end if
        Find Next Seed Feature to Extend
        IF NULL then exit
    END LOOP
Clean up intermediate structures
```

[1] Maps transactions to block numbers and parent block numbers.

Validation and Error Messages

The validation operation checks that the name of training table is not NULL, that it exists and that it is not empty. It checks that the predictor column name and predictor value name are not NULL and that they exist in the training table. It checks that the model table name (result) is not NULL. It validates that the configuration parameters, if specified are within range: MaximumNetworkFeatureDepth, Maximum-NumberOfNetworkFeatures, and MaxBuildTime must all be greater than or equal to 0. If the parameters are 0, it sets them to the default values. MaximumConsecutivePrunedNetworkFeature can have a negative value. A negative value indicates that only a single feature is built and compared to the Naive Bayes Model. It validates that the names has been given for the output tables (described below).

An additional run time error message occurs if the model table is empty or the rules table is empty.

ABN Outputs

The output for this component includes 4 tables resulting from the build operation and one from the apply operation. There is a model table that contains the metadata required to score with the model. The schema for this table and its use are described in the Apply section.

There are three tables produced to enable the Java API to obtain the mining rules in decision tree format. The schema and use are described in Mining Rules section. In addition there is a timings table that reports statistics on the timing to achieve build milestones.

The schema for the timings table is shown in FIG. 20.

The apply operation produces a results table that includes transaction ID, target value and predicted probability. In addition, if the user does not specify a priors, the component returns a priors table. This table is required for the apply operation.

General Model Building and Scoring

Figure 21:
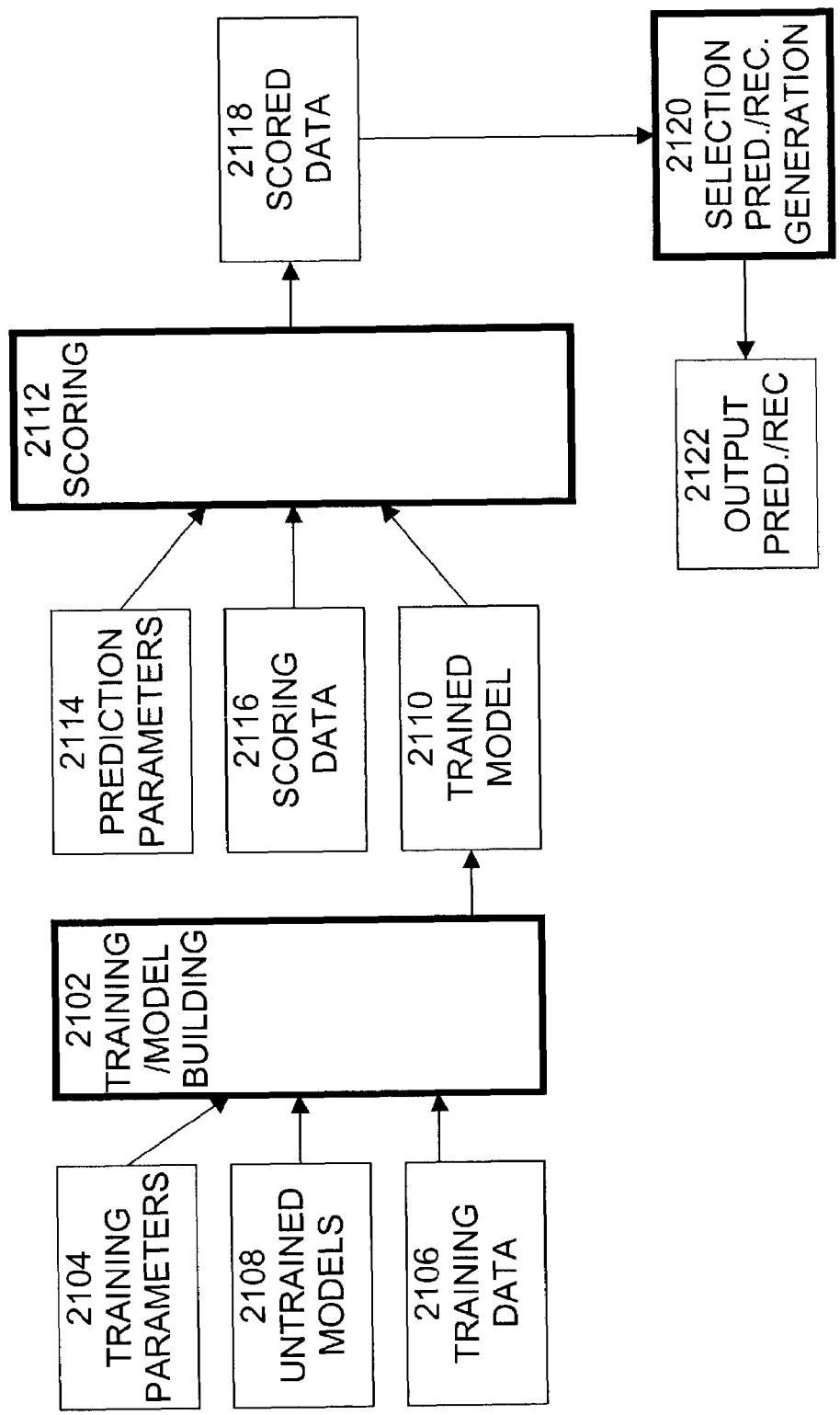
FIG. 21 is an exemplary data flow diagram of a data mining process, including building and scoring of models and generation of predictions/recommendations.

An exemplary data flow diagram of a data mining process, including building and scoring of models and generation of predictions/recommendations, is shown in FIG. 21. The training/model building step 2102 involves generating the models that are used to perform data mining recommendation and prediction. The inputs to training/model building step 2102 include training parameters 2104, training data 2106, and untrained models 2108. Untrained models 2108 include algorithms that process the training data 2106 in order to actually build the models. In particular, untrained models 2108 includes ABN algorithms that are used to build data mining models that are based on adaptive Bayes networks. Training parameters 2104 are parameters, described above, that are input to the data-mining model building algorithms to control how the algorithms build the models. Training data 2106 is data that is input to the algorithms and which is used to actually build the models.

Training/model building step 2102 invokes the data mining model building algorithms included in untrained models 2108, initializes the algorithms using the training parameters 2104, processes training data 2106 using the algorithms to build the model, and generates trained model 2110. Trained model 2110 includes representations of the ABN model, as described above. Trained model 2110 may also be evaluated and adjusted in order to improve the quality, i.e. prediction accuracy, of the model. Trained model 2110 is then encoded in an appropriate format and deployed for use in making predictions or recommendations.

Scoring step 2112 involves using the deployed trained model 2110 to make predictions or recommendations based on new data that is received. Trained model 2110, prediction parameters 2114, and prediction data 2116 are input to scoring step 2112. Trained models 2110 include information defining the model that was generated by model building step 2102. Prediction parameters 2114 are parameters that are input to the scoring step 2118 to control the scoring of scoring data 2116 against trained model 2110 and are input to the selection and prediction/recommendation step 2120 to control the selection of the scored data and the generation of predictions and recommendations.

Scoring data 2116 is processed according trained model 2110, as controlled by prediction parameters 2114, to generate one or more scores for each row of data in scoring data 2116. The scores for each row of data indicate how closely the row of data matches attributes of the model, how much confidence may be placed in the prediction, how likely each output prediction/recommendation to be true, and other statistical indicators. Scored data 2118 is output from scoring step 2112 and includes predictions or recommendations, along with corresponding probabilities for the scored data.

Scored data 2118 is input to selection and prediction/recommendation generation step, which evaluates the probabilities associated with the predictions/recommendations and selects at least a portion of the predictions/recommendations. The selected predictions/recommendations are those having probabilities meeting the selection criteria. The selection criteria may be defined by desired results data and/or by predefined or default criteria included in selection/generation step 2120. In addition, the selection criteria may include a limit on the number of predictions/recommendations that are to be selected, or may indicate that the predictions/recommendations are to be sorted based on their associated probabilities. The selected predictions/recommendations are output 2122 from step 2120 for use in data mining.

Figure 22:
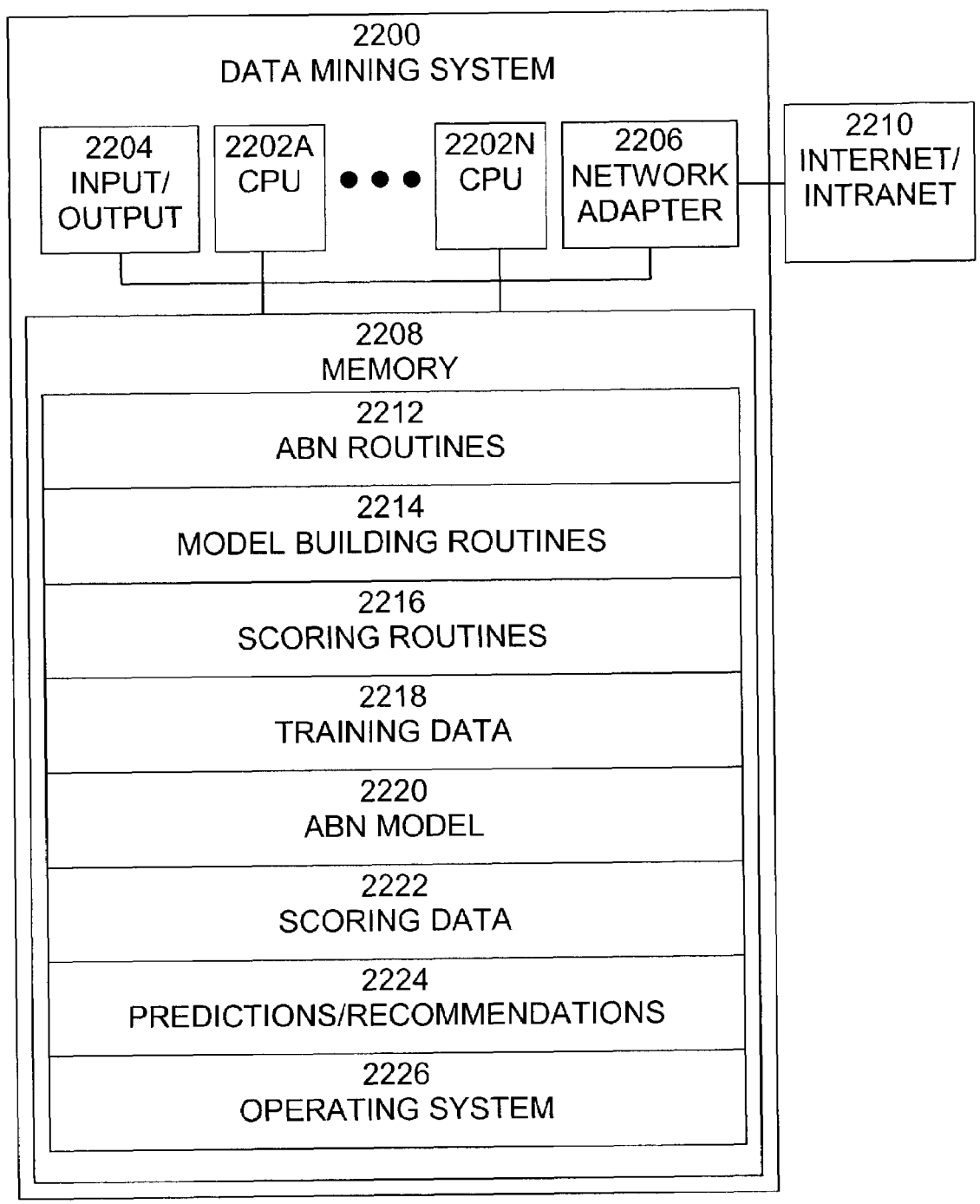
FIG. 22 is an exemplary block diagram of a data mining system, in which the present invention may be implemented.

An exemplary block diagram of a data mining system 2200, in which the present invention may be implemented, is shown in FIG. 22. System 2200 is typically a programmed general-purpose computer system, such as a personal computer, workstation, server system, and minicomputer or mainframe computer. System 2200 includes one or more processors (CPUs) 2202A–2202N, input/output circuitry 2204, network adapter 2206, and memory 2208. CPUs 2202A–2202N execute program instructions in order to carry out the functions of the present invention. Typically, CPUs 2202A–2202N are one or more microprocessors, such as an INTEL PENTIUM® processor. FIG. 22 illustrates an embodiment in which system 2200 is implemented as a single multi-processor computer system, in which multiple processors 2202A–2202N share system resources, such as memory 2208, input/output circuitry 2204, and network adapter 2206. However, the present invention also contemplates embodiments in which system 2200 is implemented as a plurality of networked computer systems, which may be single-processor computer systems, multi-processor computer systems, or a mix thereof.

Input/output circuitry 2204 provides the capability to input data to, or output data from, system 2200. For example, input/output circuitry may include input devices, such as keyboards, mice, touchpads, trackballs, scanners, etc., output devices, such as video adapters, monitors, printers, etc., and input/output devices, such as, modems, etc. Network adapter 2206 interfaces system 2200 with Internet/intranet 2210. Internet/intranet 2210 may include one or more standard local area network (LAN) or wide area network (WAN), such as Ethernet, Token Ring, the Internet, or a private or proprietary LAN/WAN.

Memory 2208 stores program instructions that are executed by, and data that are used and processed by, CPU 2202 to perform the functions of system 2200. Memory 2208 may include electronic memory devices, such as random-access memory (RAM), read-only memory (ROM), programmable read-only memory (PROM), electrically erasable programmable read-only memory (EEPROM), flash memory, etc., and electromechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

In the example shown in FIG. 22, memory 2208 includes ABN routines 2212, model building routines 2214, scoring routines 2216, training data 2218, trained ABN model 2220, scoring data 2222, predictions/recommendations 2224, and operating system 2226. ABN routines 2212 implement ABN algorithms that are used to build data mining models that are based on adaptive Bayes networks. Model building routines 2214 invoke the ABN routines 2212 that implement the ABN data mining model building algorithms, processes training data 2218 using the algorithms to build the model, and generates trained ABN model 2220. Scoring routines 2216 use the trained ABN model 2220 to process scoring data 2222 to generate one or more scores for each row of data in scoring data 2222. The scores for each row of data indicate how closely the row of data matches attributes of the model, how much confidence may be placed in the prediction, how likely each output prediction/recommendation to be true, and other statistical indicators. Training data 2218 is data that is input to the algorithms and which is used to actually build the models. ABN model 2220 includes representations of the ABN model that are used for scoring data 2222. Scoring data 2222 is processed according to ABN model 2220 to generate one or more scores for each row of data in scoring data 2222. Predictions/recommendations 2224 are scored data that may have been selected and/or evaluated as having probabilities meeting selection criteria. The selection criteria may be defined by desired results data and/or by predefined or default criteria and/or may include a limit on the number of predictions/recommendations that are to be selected, or may indicate that the predictions/recommendations are to be sorted based on their associated probabilities. Operating system 2226 provides overall system functionality.

As shown in FIG. 22, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and WINDOWS®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of generating an Adaptive Bayes Network data mining model comprising the steps of:
   receiving a data table having a plurality of predictor columns and a target column and comprising a plurality of rows of data;
   constructing a plurality of single-predictor models, comprising the steps of:
      computing a description length of a baseline model based on unconditional target probabilities among the plurality of rows;
      determining which predictor columns are correlated to the target column based on minimum description length;
      computing probabilities of at least two target values of the target column conditioned on at least two predictor values of at least one correlated predictor column; and
      computing a probability of at least one correlated predictor column conditioned on the at least two target values;
   ranking each predictor column by ranking each single-predictor model using minimum description length and selecting a best single predictor model;
   performing feature selection based on a minimum of a specified number of predictors and as a function of a reduction in entropy attributable to the best single predictor model;
   constructing a Naïve Bayes model using a top-ranked portion of the plurality of predictor columns;
   comparing a description length of the Naive Bayes model with a description length of a baseline model;
   replacing the baseline model with the Naïve Bayes model, if the description length of the Naive Bayes model is less than the description length of the baseline model;
   extending a plurality of single-predictor models in rank order, stepwise, to multi-predictor features; and
   testing whether each new feature should be included in or should replace a current model state using minimum description length.

2. The method of claim 1, wherein the step of constructing a plurality of single-predictor models further comprises the step of binning values included in the predictor columns.

3. The method of claim 2, wherein the step of ranking each predictor column by ranking each single-predictor model using minimum description length comprises the steps of:
   generating histograms of the target within each predictor bin value; and
   obtaining, from the histograms, smoothed probabilities of target value conditioned on predictor value estimated as a proportion of each target value within a given predictor bin value.

4. The method of claim 3, wherein the step of ranking each predictor column by ranking each single-predictor model using minimum description length comprises the step of:
   computing the description length as a sum of a penalty term, $\Sigma \log_2 (n_t+1)$, where $n_t$ is a number of training row instances of an ith value of a predictor; and a transmission cost, $-\Sigma \log_2(p_{ij})n_{ij}$, where $p_{ij}$ is the probability of a jth target value conditioned on an ith predictor value and $n_{ij}$ is a corresponding count.

5. The method of claim 4, wherein the step of extending a plurality of single-predictor models to multi predictor features comprises the steps of:
   extending a portion of the plurality of single-predictor models to multi-predictor features, one predictor at a time as far as minimum description length or a maximum depth parameter permits in rank order; and
   extending each model to include a portion of the plurality of multi-predictor features as far as minimum description length pruning or a maximum number of network features parameter permits.

6. The method of claim 5, further comprising the step of:
   biasing against selection of predictors with many missing values by using an encoding reflecting a proportion of potential single-predictor models attributable to each predictor.

7. The method of claim 6, further comprising the step of:
   applying a reduced penalty term to a product model due to bias inherent in the product model's assumptions concerning data in the data table.

8. A system for generating an Adaptive Bayes Network data mining model comprising:
   a processor operable to execute computer program instructions;
   a memory operable to store computer program instructions executable by the processor; and
   computer program instructions stored in the memory and executable to perform the steps of:
   receiving a data table having a plurality of predictor columns and a target column and comprising a plurality of rows of data;
   constructing a plurality of single-predictor models, comprising the steps of:
      computing a description length of a baseline model based on unconditional target probabilities among the plurality of rows;
      determining which predictor columns are correlated to the target column based on minimum description length;
      computing probabilities of at least two target values of the target column conditioned on at least two predictor values of at least one correlated predictor column; and
      computing a probability of at least one correlated predictor column conditioned on the at least two target values;
   ranking each predictor column by ranking each single-predictor model using minimum description length and selecting a best single predictor model;
   performing feature selection based on a minimum of a specified number of predictors and as a function of a reduction in entropy attributable to the best single predictor model;
   constructing a Naïve Bayes model using a top-ranked portion of the plurality of predictor columns;
   comparing a description length of the Naive Bayes model with a description length of a baseline model;
   replacing the baseline model with the Naïve Bayes model, if the description length of the Naive Bayes model is less than the description length of the baseline model;
   extending a plurality of single-predictor models in rank order, stepwise, to multi-predictor features; and
   testing whether each new feature should be included in or should replace a current model state using minimum description length.

9. The system of claim 8, wherein the step of constructing a plurality of single-predictor models further comprises the step of binning values included in the predictor columns.

10. The system of claim 9, wherein the step of ranking each predictor column by ranking each single-predictor model using minimum description length comprises the steps of:
   generating histograms of the target within each predictor bin value; and
   obtaining, from the histograms, smoothed probabilities of target value conditioned on predictor value estimated as a proportion of each target value within a given predictor bin value.

11. The method of claim 10, wherein the step of ranking each predictor column by ranking each single-predictor model using minimum description length comprises the step of:
   computing the description length as a sum of a penalty term, $\Sigma \log_2(n_i+1)$, where $n_i$ is a number of training row instances of an ith value of a predictor; and a transmission cost, $-\Sigma \log_2(p_{ij})n_{ij}$, where $p_{ij}$ is the probability of a jth target value conditioned on an ith predictor value and $n_{ij}$ is a corresponding count.

12. The system of claim 11, wherein the step of extending a plurality of single-predictor models to multi predictor features comprises the steps of:
   extending a portion of the plurality of single-predictor models to multi-predictor features, one predictor at a time as far as minimum description length or a maximum depth parameter permits in rank order; and
   extending each model to include a portion of the plurality of multi-predictor features as far as minimum description length pruning or a maximum number of network features parameter permits.

13. The system of claim 12, further comprising the step of:
   biasing against selection of predictors with many missing values by using an encoding reflecting a proportion of potential single-predictor models attributable to each predictor.

14. The system of claim 13, further comprising the step of:
   applying a reduced penalty term to a product model due to bias inherent in the product model's assumptions concerning data in the data table.

15. A computer program product for generating an Adaptive Bayes Network data mining model, comprising:
   a computer readable medium;
   computer program instructions, recorded on the computer readable medium, executable by a processor, for performing the steps of
   receiving a data table having a plurality of predictor columns and a target column and comprising a plurality of rows of data;
   constructing a plurality of single-predictor models, comprising the steps of:
      computing a description length of a baseline model based on unconditional target probabilities among the plurality of rows;
      determining which predictor columns are correlated to the target column based on minimum description length;
      computing probabilities of at least two target values of the target column conditioned on at least two predictor values of at least one correlated predictor column; and
      computing a probability of at least one correlated predictor column conditioned on the at least two target values;
      ranking each predictor column by ranking each single-predictor model using minimum description length and selecting a best single predictor model;
   performing feature selection based on a minimum of a specified number of predictors and as a function of a reduction in entropy attributable to the best single predictor model;
   constructing a Naïve Bayes model using a top-ranked portion of the plurality of predictor columns;
   comparing a description length of the Naive Bayes model with a description length of a baseline model;
   replacing the baseline model with the Naïve Bayes model, if the description length of the Naive Bayes model is less than the description length of the baseline model;
   extending a plurality of single-predictor models in rank order, stepwise, to multi-predictor features; and
   testing whether each new feature should be included in or should replace a current model state using minimum description length.

16. The computer program product of claim 15, wherein the step of constructing a plurality of single-predictor models further comprises the step of binning values included in the predictor columns.

17. The computer program product of claim 16, wherein the step of ranking each predictor column by ranking each single-predictor model using minimum description length comprises the steps of:
   generating histograms of the target within each predictor bin value; and
   obtaining, from the histograms, smoothed probabilities of target value conditioned on predictor value estimated as a proportion of each target value within a given predictor bin value.

18. The computer program product of claim 17, wherein the step of ranking each predictor column by ranking each single-predictor model using minimum description length comprises the step of:
   computing the description length as a sum of a penalty term, $\Sigma \log_2(n_i+1)$, where $n_i$ is a number of training row instances of an ith value of a predictor; and a transmission cost, $-\Sigma \log_2(p_{ij})n_{ij}$, where $p_{ij}$ is the probability of a jth target value conditioned on an ith predictor value and $n_{ij}$ is a corresponding count.

19. The computer program product of claim 18, wherein the step of extending a plurality of single-predictor models to multi predictor features comprises the steps of:
   extending a portion of the plurality of single-predictor models to multi-predictor features, one predictor at a time as far as minimum description length or a maximum depth parameter permits in rank order; and
   extending each model to include a portion of the plurality of multi-predictor features as far as minimum description length pruning or a maximum number of network features parameter permits.

20. The computer program product of claim 19, further comprising the step of:
   biasing against selection of predictors with many missing values by using an encoding reflecting a proportion of potential single-predictor models attributable to each predictor.

21. The computer program product of claim 20, further comprising the step of:
   applying a reduced penalty term to a product model due to bias inherent in the product model's assumptions concerning data in the data table.

* * * * *